US012586030B1

(12) United States Patent
Sharma et al.

(10) Patent No.: US 12,586,030 B1
(45) Date of Patent: Mar. 24, 2026

(54) SYSTEM AND METHOD OF CONSOLIDATED DELIVERY OF ORDERS FROM MULTIPLE STORES

(71) Applicant: Blue Yonder Group, Inc., Scottsdale, AZ (US)

(72) Inventors: Dipty Sharma, Bhopal (IN); Raghuveer Prasad Nagar, Kota (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 191 days.

(21) Appl. No.: 18/386,182

(22) Filed: Nov. 1, 2023

Related U.S. Application Data

(60) Provisional application No. 63/449,390, filed on Mar. 2, 2023, provisional application No. 63/445,156, filed on Feb. 13, 2023.

(51) Int. Cl.
| | |
|---|---|
| *G06Q 10/087* | (2023.01) |
| *G06Q 10/083* | (2024.01) |
| *G06Q 30/0601* | (2023.01) |
| *H04W 4/029* | (2018.01) |

(52) U.S. Cl.
CPC ......... *G06Q 10/087* (2013.01); *G06Q 10/083* (2013.01); *G06Q 30/0633* (2013.01); *H04W 4/029* (2018.02)

(58) Field of Classification Search
CPC ............... G06Q 10/087; G06Q 10/083; G06Q 30/0633; H04W 4/029
See application file for complete search history.

(56) References Cited

U.S. PATENT DOCUMENTS

| | | | |
|---|---|---|---|
| 10,943,289 B2 * | 3/2021 | Mattingly | ......... G06Q 30/0635 |
| 11,126,959 B2 | 9/2021 | Grabovski et al. | |
| 11,605,050 B2 | 3/2023 | Agasti et al. | |

(Continued)

OTHER PUBLICATIONS

Ketzenberg et al., "How 'Buy Online, Pick Up In-Store' Gives Retailers an Edge," Harvard Business Review, Business Models, May 25, 2021. Accessed at https://hbr.org/2021/05/how-buy-online-pick-up-in-store-gives-retailers-an-edge (Year: 2021).

(Continued)

*Primary Examiner* — Garcia Ade
(74) *Attorney, Agent, or Firm* — Spencer Fane LLP; Steven J. Laureanti

(57) ABSTRACT

A system and method are disclosed for consolidating orders for fulfillment. The method includes detecting that a shopper has arrived at a shopping mall, determining and predicting items or orders that the shopper is expected to pick up or likely to purchase during a current visit to the shopping mall, determining whether the shopper is expected to participate in one or more other non-shopping activities in the shopping mall, and determining a predicted exit time of the shopper from the shopping mall, in response to determining that the shopper is expected to carry at least one bag, determining a consolidated pickup or delivery service for the items or the orders, and offer the consolidated pickup or delivery service to the shopper. The method further includes where detecting the shopper arrival is based on one or more of: smartphone location, calendar data, a manual input and the shopper's first order.

20 Claims, 5 Drawing Sheets

(56) References Cited

U.S. PATENT DOCUMENTS

| 2018/0330426 | A1* | 11/2018 | Kumar | G06Q 30/0635 |
| 2019/0362307 | A1 | 11/2019 | Agasti et al. | |
| 2020/0394606 | A1* | 12/2020 | Fan | H04W 4/029 |

OTHER PUBLICATIONS

Deloitte Canada, "The Future of the Mall," Deloitte Consumer Industrial Products Articles, Jul. 13, 2020. Accessed at https://web.archive.org/web/20200713174704/https://www2.deloitte.com/ca/en/pages/consumer-industrial-products/articles/future-of-the-mall.html (Year: 2020).

* cited by examiner

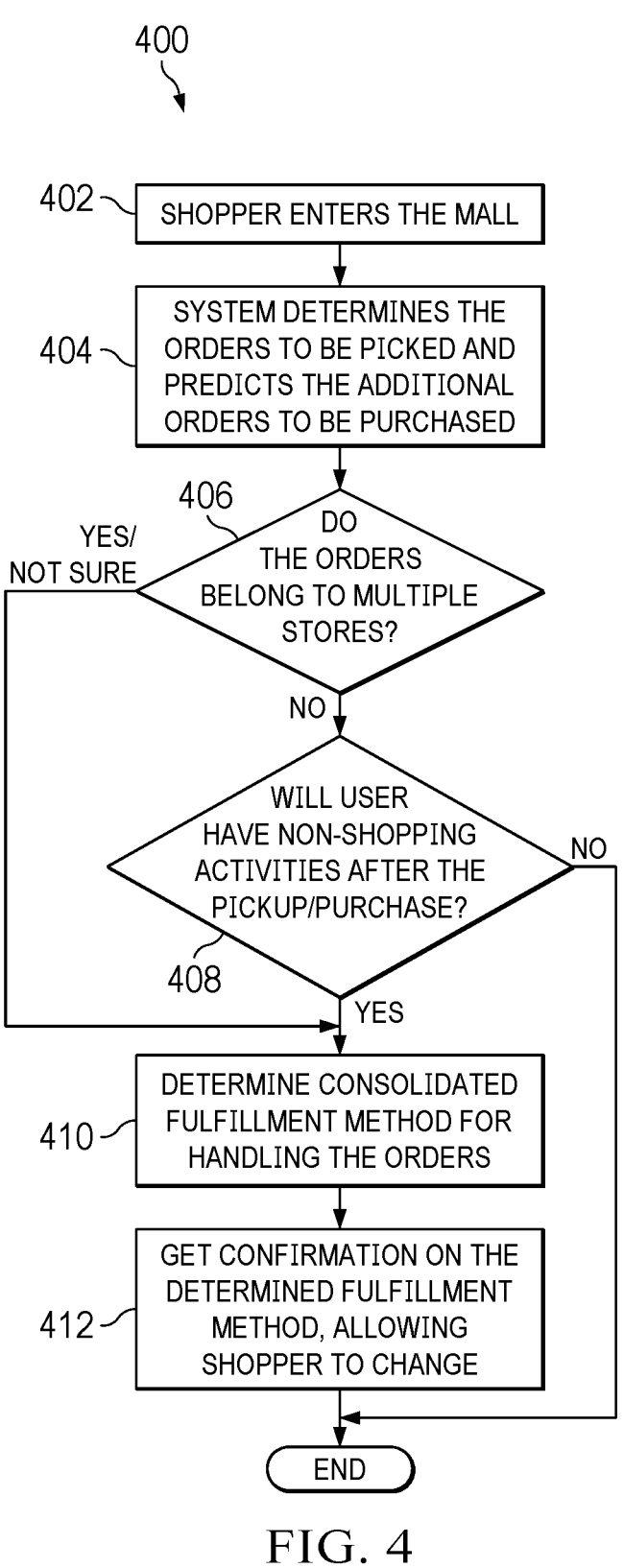

400

402 — SHOPPER ENTERS THE MALL

404 — SYSTEM DETERMINES THE ORDERS TO BE PICKED AND PREDICTS THE ADDITIONAL ORDERS TO BE PURCHASED

406 — DO THE ORDERS BELONG TO MULTIPLE STORES?

YES/ NOT SURE

NO

WILL USER HAVE NON-SHOPPING ACTIVITIES AFTER THE PICKUP/PURCHASE?

408

NO

YES

410 — DETERMINE CONSOLIDATED FULFILLMENT METHOD FOR HANDLING THE ORDERS

412 — GET CONFIRMATION ON THE DETERMINED FULFILLMENT METHOD, ALLOWING SHOPPER TO CHANGE

END

FIG. 4

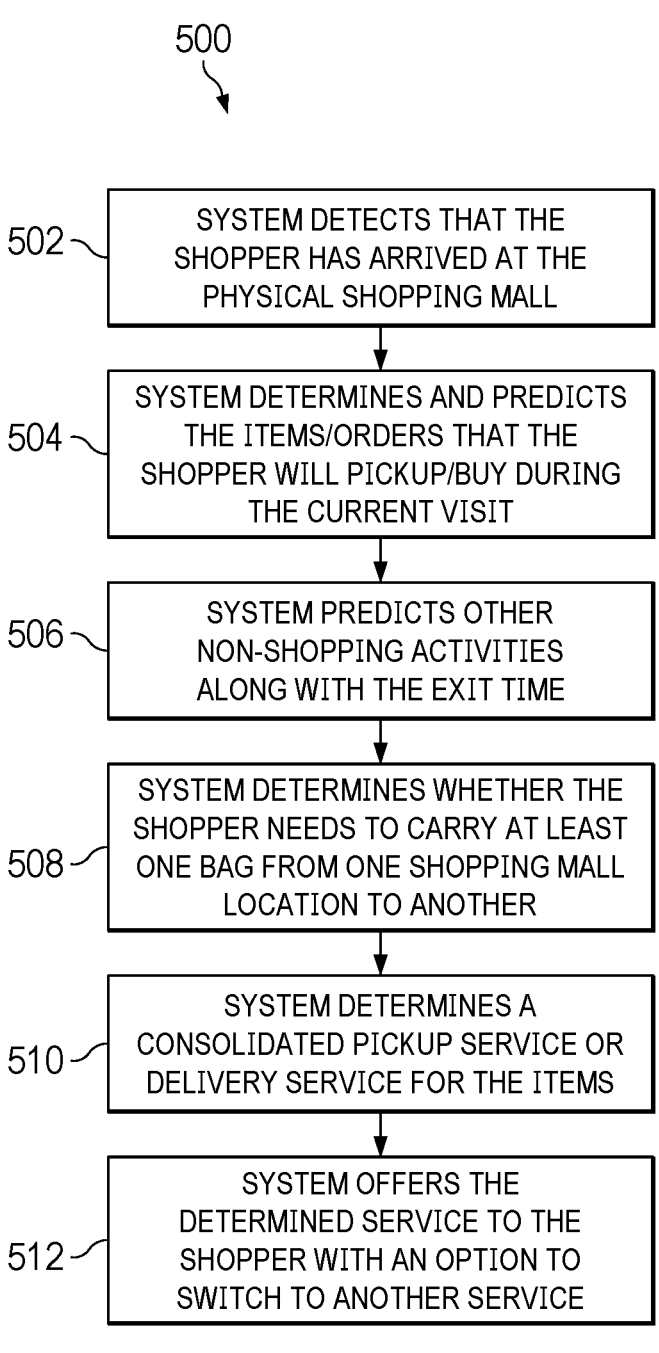

500

502 — SYSTEM DETECTS THAT THE SHOPPER HAS ARRIVED AT THE PHYSICAL SHOPPING MALL

504 — SYSTEM DETERMINES AND PREDICTS THE ITEMS/ORDERS THAT THE SHOPPER WILL PICKUP/BUY DURING THE CURRENT VISIT

506 — SYSTEM PREDICTS OTHER NON-SHOPPING ACTIVITIES ALONG WITH THE EXIT TIME

508 — SYSTEM DETERMINES WHETHER THE SHOPPER NEEDS TO CARRY AT LEAST ONE BAG FROM ONE SHOPPING MALL LOCATION TO ANOTHER

510 — SYSTEM DETERMINES A CONSOLIDATED PICKUP SERVICE OR DELIVERY SERVICE FOR THE ITEMS

512 — SYSTEM OFFERS THE DETERMINED SERVICE TO THE SHOPPER WITH AN OPTION TO SWITCH TO ANOTHER SERVICE

FIG. 5

SYSTEM AND METHOD OF CONSOLIDATED DELIVERY OF ORDERS FROM MULTIPLE STORES

CROSS-REFERENCE TO RELATED APPLICATIONS

The present disclosure is related to that disclosed in the U.S. Provisional Application No. 63/445,156, filed Feb. 13, 2023, entitled "Consolidated Delivery of Orders from Multiple Stores" and U.S. Provisional Application No. 63/449,390, filed Mar. 2, 2023, entitled "Multi-Channel Offers for Collaborating Stores Based on Shopping from a Physical Store." U.S. Provisional Application Nos. 63/445,156 and 63/449,390 are assigned to the assignee of the present application. The present invention hereby claims priority under 35 U.S.C. § 119(e) to U.S. Provisional Application Nos. 63/445,156 and 63/449,390.

TECHNICAL FIELD

The present disclosure relates generally to supply chain fulfillment and specifically to consolidating orders from multiple stores in a supply chain.

BACKGROUND

Shopping at physical retail stores is the traditional way of shopping and remains common across the globe despite the advancement of electronic commerce or e-commerce. Shopping at physical stores is often done at shopping malls or shopping centers that offer additional non-shopping activities such as entertainment zones, movie theaters, and restaurants. However, existing retail experiences may include issues associated with carrying purchased items throughout a shopping mall or shopping center. For example, a shopper may feel restricted by carrying too many bags and reduce the number of purchases as a result. As another example, a shopper may lose bags while attending non-shopping activities. Existing retail systems fail to alleviate the burden of carrying purchased items throughout a shopping mall, which leads to increased burden to the shopper and decreased sales of retail stores, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 4 illustrates a method for consolidating orders of recommended items, in accordance with an embodiment; and FIG. 5 illustrates a method for consolidating orders for fulfillment, in accordance with an embodiment.

DETAILED DESCRIPTION

Figure 1:
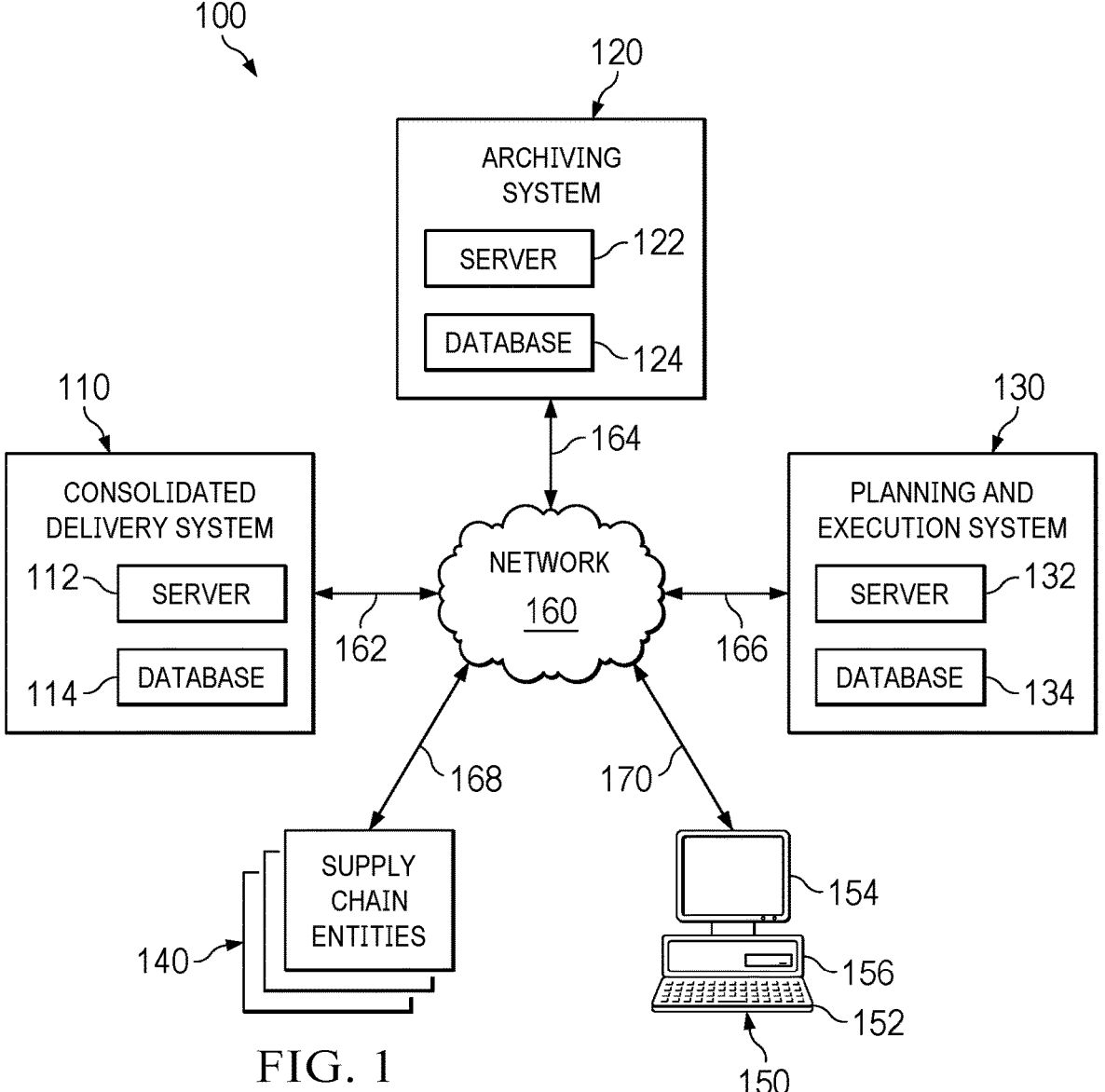
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide systems and methods of offering consolidated pickup and delivery services for customers when predicting that a shopper may make purchases from multiple stores. Embodiments may offer consolidated service within a parking or exit zone of a shopping mall, or as consolidated home delivery. Embodiments may predict additional items for the shopper to purchase while offering the consolidated delivery service. Embodiments may predict whether the shopper likely needs to carry at least one physical bag from one place to another within a physical shopping mall, predict shopping and non-shopping activities that the shopper is likely to perform in the current visit to the physical shopping mall, and recommending consolidated pickup or delivery service for all the bags.

Embodiments of the following disclosure enable systems and methods that may enable retailers to offer convenient and secure shopping options to their shoppers, which may improve customer loyalty to a retailer or shopping mall business. Embodiments may improve the ease and convenience of shopping at a shopping mall or at a group of related stores. Use of embodiments may reduce the number of bags that a shopper carries while shopping at a shopping mall or similar retailer and may reduce the incidence of losing bags while shopping. Implementation of the systems and method described herein may include the pre-registration of customers to data collection and processing services to protect customer data privacy.

FIG. 1 illustrates supply chain network 100, in accordance with a first embodiment. Supply chain network 100 comprises consolidated delivery system 110, archiving system 120, planning and execution system 130, one or more supply chain entities 140, one or more computers 150, network 160, and one or more communication links 162-170. Although a single consolidated delivery system 110, a single archiving system 120, a single planning and execution system 130, one or more supply chain entities 140, one or more computers 150, a single network 160, and one or more communication links 162-170 are shown and described, embodiments contemplate any number of consolidated delivery systems, archiving systems, planning and execution systems, supply chain entities, computers, networks, or communication links, according to particular needs.

In one embodiment, consolidated delivery system 110 comprises server 112 and database 114. As described in further detail below, consolidated delivery system 110 may detect that a shopper has entered a shopping mall and based on shopper data 222 (FIG. 2) and predict that the shopper is likely to visit multiple stores within the shopping mall. In embodiments, consolidated delivery system 110 may then offer a consolidated delivery or pickup option for the shopper, enabling the shopper to continue the visit to the shopping mall without carrying purchased items throughout the shopping mall. In embodiments, consolidated delivery system 110 may also predict additional items the shopper may want to purchase within the shopping mall and offer the additional items as recommendations to the shopper.

Archiving system 120 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from planning and execution system 130 and/or one or more computers 150 of supply chain network 100. According to some embodiments, archiving system 120 comprises an archive of data received from planning and execution system 130 and/or one or more computers 150 of supply chain network 100. Archiving system 120 provides archived data to consolidated delivery system 110 and/or planning and execution system 130. Server 122 may store the received data in database 124. Database 124 of archiving system 120 may comprise one or more databases or other data storage arrangements at one or more locations, local to, or remote from, server 122.

According to an embodiment, planning and execution system 130 comprises server 132 and database 134. Supply chain planning and execution is typically performed by several distinct and dissimilar processes, including, for example, assortment planning, demand planning, operations planning, production planning, supply planning, distribution planning, execution, pricing, forecasting, transportation management, warehouse management, inventory management, fulfillment, procurement, and the like. Server 132 of planning and execution system 130 comprises one or more modules, such as, for example, an order capture module, a sourcing module, a scheduling module, and/or a pick-pack-ship module for performing one or more order fulfillment processes. Server 132 stores and retrieves data from database 134 or one or more locations in supply chain network 100. In addition, planning and execution system 130 operates on one or more computers 150 that are integral to or separate from the hardware and/or software that support archiving system 120 and consolidated delivery system 110.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Retailers may also be a shopping mall. As used herein, the term "shopping mall" may refer to a physical building containing one or more retail stores, but may also refer to other collections of related or physically co-located retailers or storefronts, such as stores located in a city center, stores located on a particular street, stores in a particular downtown area or other city subsection, or any other collection of individual retailers acting together to provide a consolidated delivery service as described herein. Retailers may have one or more resources, such as, for example, humans, machines, robots, or the like. Manufacturers may be any suitable entity that manufactures at least one product, which may be sold by one or more retailers.

Suppliers may be any suitable entity that offers to sell or otherwise provides one or more items (i.e., materials, components, or products) to one or more manufacturers. Although one example of supply chain network 100 is illustrated and described, embodiments contemplate any configuration of supply chain network 100, without departing from the scope described herein.

As shown in FIG. 1, supply chain network 100 comprising consolidated delivery system 110, archiving system 120, planning and execution system 130, and one or more supply chain entities 140 may operate on one or more computers 150 that are integral to or separate from the hardware and/or software that support consolidated delivery system 110, archiving system 120, planning and execution system 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the methods. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from, consolidated delivery system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with consolidated delivery system 110 and archiving system 120.

In one embodiment, consolidated delivery system 110 may be coupled with network 160 using communication link 162, which may be any wireline, wireless, or other link suitable to support data communications between consolidated delivery system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. One or more computers 150 may be coupled with network 160 using communication link 170, which may be any wireline, wireless, or other link suitable to support data communications between one or more computers 150 and network 160 during operation of supply chain network 100. Although communication links 162-170 are shown as generally coupling consolidated delivery system 110, archiving system 120, planning and execution system 130, one or more supply chain entities 140, and one or more computers 150 to network 160, any of consolidated delivery system 110, archiving system 120, planning and execution system 130, one or more supply chain entities 140, and one or more computers 150 may communicate directly with each other, according to particular needs.

In another embodiment, network 160 includes the Internet and any appropriate local area networks (LANs), metropolitan area networks (MANs), or wide area networks (WANs) coupling consolidated delivery system 110, archiving system 120, planning and execution system 130, one or more supply chain entities 140, and one or more computers 150. For example, data may be maintained locally to, or externally of, consolidated delivery system 110, archiving system 120, planning and execution system 130, one or more supply chain entities 140, and one or more computers 150 and made available to one or more associated users of consolidated delivery system 110, archiving system 120, planning and execution system 130, one or more supply chain entities 140, and one or more computers 150 using network 160 or in any other appropriate manner. For example, data may be maintained in a cloud database at one or more locations external to consolidated delivery system 110, archiving system 120, planning and execution system 130, one or more supply chain entities 140, and one or more computers 150 and made available to one or more associated users of consolidated delivery system 110, archiving system 120, planning and execution system 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
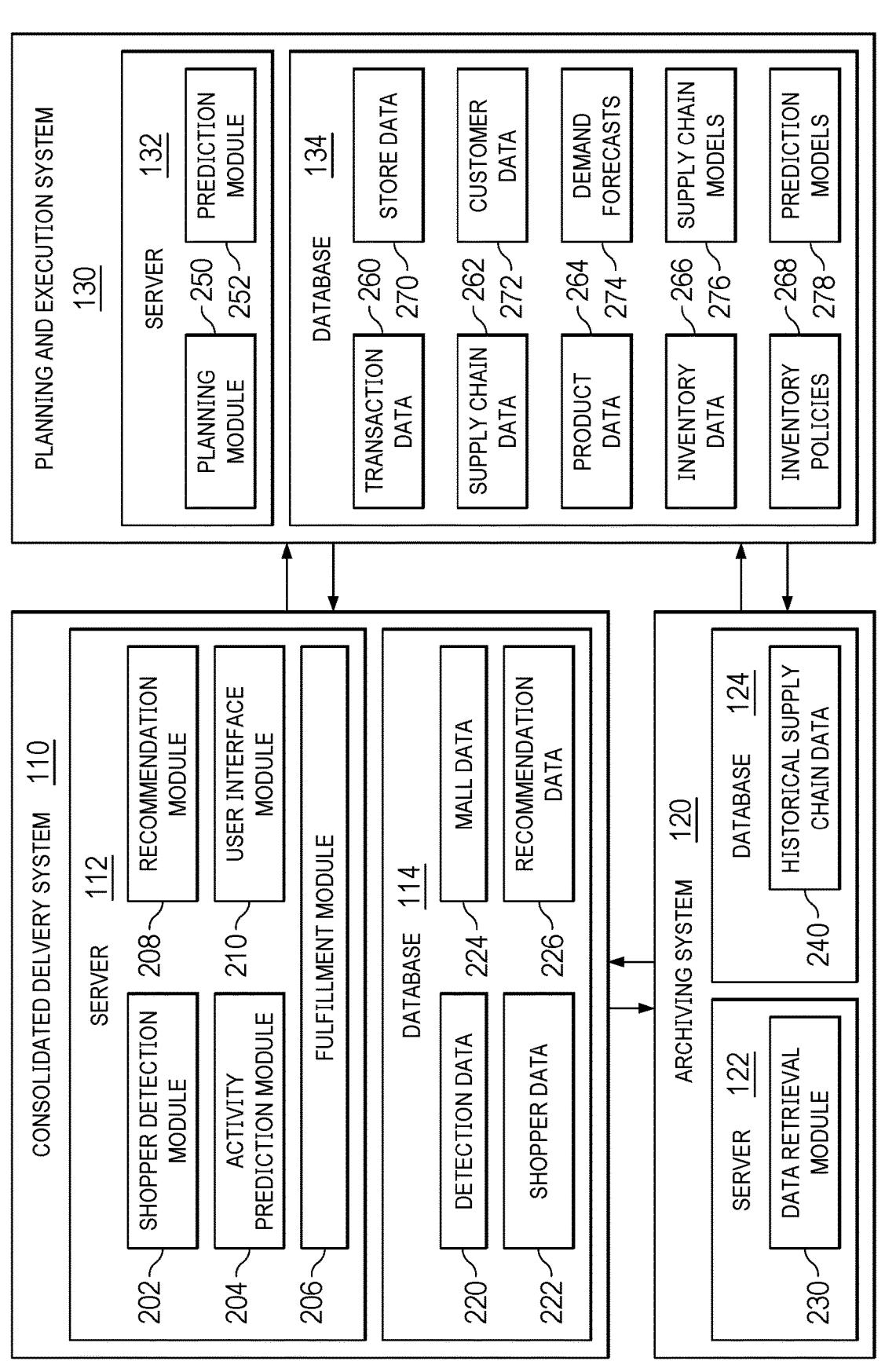
FIG. 2 illustrates the consolidated delivery system, the archiving system, and the planning and execution system of FIG. 1 in greater detail, in accordance with an embodiment.

FIG. 2 illustrates consolidated delivery system 110, archiving system 120, and planning and execution system 130 of FIG. 1 in greater detail, in accordance with an embodiment. Consolidated delivery system 110 may comprise server 112 and database 114, as described above. Although consolidated delivery system 110 is shown as comprising a single server 112 and a single database 114, embodiments contemplate any suitable number of servers or databases internal to or externally coupled with consolidated delivery system 110.

Server 112 of consolidated delivery system 110 comprises shopper detection module 202, activity prediction module 204, fulfillment module 206, recommendation module 208, and user interface module 210. Although server 112 is shown and described as comprising a single shopper detection module 202, a single activity prediction module 204, a single fulfillment module 206, a single recommendation module 208, and a single user interface module 210, embodiments contemplate any suitable number or combination of these located at one or more locations, local to, or remote from, consolidated delivery system 110, such as on multiple servers or computers 150 at one or more locations in supply chain network 100.

Shopper detection module 202 detects that a shopper has entered the shopping mall based on detection data 220. For example, the shopper may use a mobile app associated with the shopping mall, which may share location data with shopper detection module 202. Shopper detection module 202 may also gather location data from one or more mobile apps associated with individual stores of the shopping mall. In embodiments, shopper detection module 202 may also use parking data of the shopper, which may include a vehicle or license plate number that is associated with the shopper. Shopper detection module 202 may also use calendar appointments of the shopper, such as, for example, pickup or restaurant appointments within the shopping mall. In embodiments, when shopper detection module 202 cannot predict shopper presence at the mall based on location data or calendar data, shopper detection module 202 may determine that the shopper has entered the mall when the shopper makes a purchase within the mall, such as making an order associated with a phone number associated with the shopper. Shopper detection module 202 may also detect shopper presence based on scheduled picks for the shopper, face detection of the shopper, user input (such as at a kiosk of the shopping mall or using a QR code), or other activities performed within the shopping mall.

Activity prediction module 204 predicts activities that the shopper is likely to perform while visiting the shopping mall. Activity prediction module 204 may predict both shopping activities and non-shopping activities of the shopper. Shopping activities may include, for example, picking up previously purchased orders, purchasing additional items, or other activities directly related to purchasing products. Non-shopping activities may include, for example, restaurant visits, movie or other entertainment activities, or any other service a shopping mall may offer other than selling retail items. For example, using shopper data 222 comprising a calendar of the shopper, activity prediction module 204 may determine, based on a dinner appointment in the calendar, that the shopper plans to have dinner at a mall restaurant at a particular time. Activity prediction module 204 may further predict a visit completion time based on shopper data 222. For example, a booked movie ticket indicates at what time the movie ends, and thus, what time the shopper is likely to leave the shopping mall. Activity prediction module 204 may also predict whether the shopper is expected to carry one or more bags from one location of the shopping mall to another.

Fulfillment module 206 determines a consolidated fulfillment option that may be used to complete one or more orders of the shopper. Fulfillment module 206 may determine the consolidated fulfillment option based on various data, including mall data 224 and the types of items purchased. As discussed in further detail below, mall data 224 may include details or layouts of parking lots or exit areas of the shopping mall, as well as resource capacity of the shopping mall. For example, parking lot details may indicate which pickup bins are located between a likely exit door of the shopper and a car of the shopper, while resource capacity may indicate between which hours pickup and/or delivery options are available. Fulfillment module 206 may determine the consolidated fulfillment option at a configured time threshold before the predicted exit time. Fulfillment module 206 may also determine the consolidated fulfillment option based on the type of items purchased. For example, shoppers may prefer delivery options for large or heavy items, prefer pickup options for expensive items such as jewelry, and the like. In some embodiments, fulfillment module 206 may consider recommendation data 226 generated by recommendation module 208 when determining a consolidated fulfillment option.

Recommendation module 208 predicts one or more items that the shopper is likely to buy during the current visit to the shopping mall. Recommendation module 208 may predict the one or more items based on shopper data 222 of the shopper, such as purchase history, browsing history, messages of the shopper, a calendar of the shopper, a profile with preferences of the shopper, and IoT data associated with the shopper. In embodiments, recommendation module 208 may use clustering techniques, such as K-means clustering, to determine shopper clusters when predicting the items that a shopper is likely to buy.

User interface module 210 may display one or more graphical user interfaces (GUIs) on an output device of consolidated delivery system 110. The GUIs may be used to display information to a user of consolidated delivery system 110 as well as receive input from the user of consolidated delivery system 110. For example, the GUIs may be used to present one or more fulfillment options to the shopper, as well as provide the shopper with the ability to confirm a recommended fulfillment option or select a different fulfillment option.

Database 114 of consolidated delivery system 110 may comprise one or more databases or other data storage arrangements at one or more locations, local to, or remote from, server 112. Database 114 of consolidated delivery system 110 comprises, for example, detection data 220, shopper data 222, mall data 224, and recommendation data 226. Although database 114 of consolidated delivery system 110 is shown and described as comprising detection data 220, shopper data 222, mall data 224, and recommendation data 226, embodiments contemplate any suitable number or combination of data, located at one or more locations, local to, or remote from, consolidated delivery system 110, according to particular needs.

Detection data 220 comprises data used by shopper detection module 202 to detect the shopper. As discussed above, detection data 220 may comprise app data of a mobile app associated with the shopping mall or with stores of the shopping mall, location data associated with the shopper, facial recognition data of the shopper, manual input of the shopper, calendar data of the shopper, or data associated with shopper activity within the shopping mall, such as interacting with a kiosk or making a purchase.

Shopper data 222 comprises data of shoppers that may be used to predict shopper activity or to predict what items a shopper is likely to purchase. As discussed in further detail below, shopper data 222 may include purchase history data (e.g., which items a shopper has purchased from the shopping mall or patterns of visits to the shopping mall), profile data (e.g., preferences, items in saved wish-lists, items in saved carts, items being bought by a shopper clusters, and the like), calendar data (e.g., an upcoming event or booking), IoT data and browsing history data (e.g., the shopper asking a digital assistant for items with particular attributes), or message data (e.g., the shopper posting item requirements to customer-service and/or social-media). In embodiments, message data includes not only direct messages or communications between a shopper and a seller, but also any form of messaging such as social media posts. Consolidated delivery system 110 may use NLP techniques such as Naive Bayes for understanding item requirements from messages.

Mall data 224 comprises data related to the layouts, features, resources, and details of the shopping mall. As discussed in further detail below, mall data 224 may include resource capacities of the mall, the layout or locations of parking areas, and other resources such as pickup bins, in addition to any other details of the shopping mall. Recommendation data 226 comprises data related to the one or more recommended items determined by recommendation module 208. In an embodiment, recommendation data 208 may be used by fulfillment module 206 to determine the best fulfillment method for completing the order of the recommended items.

As discussed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 230. Although server 122 is shown and described as comprising a single data retrieval module 230, embodiments contemplate any suitable number or combination of data retrieval modules located at one or more locations, local to, or remote from, archiving system 120, such as on multiple servers or computers 150 at one or more locations in supply chain network 100.

In one embodiment, data retrieval module 230 of archiving system 120 receives historical supply chain data 240 from one or more planning and execution systems 130 and one or more supply chain entities 140, and stores received historical supply chain data 240 in archiving system 120 database 124. According to one embodiment, data retrieval module 230 of archiving system 120 may prepare historical supply chain data 240 for use as the training data of consolidated delivery system 110 by checking historical supply chain data 240 for errors and transforming historical supply chain data 240 to normalize, aggregate, and/or rescale historical supply chain data 240 to allow direct comparison of data received from different planning and execution systems 130, one or more supply chain entities 140, and/or one or more other locations local to, or remote from, archiving system 120. According to embodiments, data retrieval module 230 may receive data from one or more sources external to supply chain network 100, such as, for example, weather data, special events data, social media data, calendar data, and the like, and stores the received data as historical supply chain data 240.

Database 124 of archiving system 120 may comprise one or more databases or other data storage arrangements at one or more locations, local to, or remote from, server 122. Database 124 of archiving system 120 comprises, for example, historical supply chain data 240. Although database 124 of archiving system 120 is shown and described as comprising historical supply chain data 240, embodiments contemplate any suitable number or combination of data, located at one or more locations, local to, or remote from, archiving system 120, according to particular needs.

Historical supply chain data 240 comprises historical data received from consolidated delivery system 110, archiving system 120, planning and execution system 130, one or more supply chain entities 140, and/or one or more computers 150. Historical supply chain data 240 may comprise, for example, weather data, special events data, social media data, calendar data, and the like. In an embodiment, historical supply chain data 240 may comprise, for example, historic sales patterns, prices, promotions, weather conditions, and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As discussed above, planning and execution system 130 comprises server 132 and database 134. Although planning and execution system 130 is shown as comprising a single server 132 and a single database 134, embodiments contemplate any suitable number of servers or databases internal to, or externally coupled with, planning and execution system 130.

Server 132 of planning and execution system 130 comprises planning module 250, and prediction module 252. Although server 132 is shown and described as comprising a single planning module 250 and a single prediction module 252, embodiments contemplate any suitable number or combination of planning modules and prediction modules located at one or more locations, local to, or remote from, planning and execution system 130, such as on multiple servers or computers 150 at one or more locations in supply chain network 100.

Database 134 of planning and execution system 130 may comprise one or more databases or other data storage arrangements at one or more locations, local to, or remote from, server 132. Database 134 of planning and execution system 130 comprises, for example, transaction data 260, supply chain data 262, product data 264, inventory data 266, inventory policies 268, store data 270, customer data 272, demand forecasts 274, supply chain models 276, and prediction models 278. Although database 134 of planning and execution system 130 is shown and described as comprising transaction data 260, supply chain data 262, product data 264, inventory data 266, inventory policies 268, store data 270, customer data 272, demand forecasts 274, supply chain models 276, and prediction models 278, embodiments contemplate any suitable number or combination of data, located at one or more locations local to, or remote from, planning and execution system 130, according to particular needs.

Planning module 250 of planning and execution system 130 works in connection with prediction module 252 to generate a plan based on one or more predicted retail volumes, classifications, or other predictions. By way of example and not of limitation, planning module 250 may comprise a demand planner that generates a demand forecast for one or more supply chain entities 140. Planning module 250 may generate the demand forecast, at least in part, from predictions and calculated factor values for one or more causal factors received from prediction module 252. By way of a further example, planning module 250 may comprise an assortment planner and/or a segmentation planner that generates product assortments that match causal effects calculated for one or more customers or products by prediction module 252, which may provide for increased customer satisfaction and sales, as well as reducing costs for shipping and stocking products at stores where they are unlikely to sell.

Prediction module 252 of planning and execution system 130 applies samples of transaction data 260, supply chain data 262, product data 264, inventory data 266, store data 270, customer data 272, demand forecasts 274, and other data to prediction models 278 to generate predictions and calculated factor values for one or more causal factors. Prediction module 252 of planning and execution system 130 predicts a volume Y (target) from a set of causal factors X along with causal factors strengths that describe the strength of each causal factor variable contributing to the predicted volume. According to some embodiments, prediction module 252 generates predictions at daily intervals. However, embodiments contemplate longer and shorter prediction phases that may be performed, for example, weekly, twice a week, twice a day, hourly, or the like.

Transaction data 260 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, promotions, and/or the like. In addition, transaction data 260 is represented by any suitable combination of values and dimensions, aggregated or un-aggregated, such as, for example, sales per week, sales per week per location, sales per day, sales per day per season, or the like.

Supply chain data 262 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 264 of database 134 may comprise products identified by, for example, a product identifier (such as a Stock Keeping Unit (SKU), Universal Product Code (UPC) or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 134 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 266 in database 134, which may be used by planning and execution system 130 to place orders, set inventory levels at one or more stocking points, initiate manufacturing of one or more components, or the like in response to, and based at least in part on, a forecasted demand of planning and execution system 130.

Inventory policies 268 of database 134 may comprise any suitable inventory policy describing the reorder point and target quantity, or other inventory policy parameters that set rules for consolidated delivery system 110 and/or planning and execution system 130 to manage and reorder inventory. Inventory policies 268 may be based on target service level, demand, cost, fill rate, or the like. According to embodiments, inventory policies 268 comprise target service levels that ensure that a service level of one or more supply chain entities 140 is met with a set probability. For example, one or more supply chain entities 140 may set a service level at 95%, meaning one or more supply chain entities 140 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, consolidated delivery system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies 268 may be used for perishable goods, such as fruit, vegetables, dairy, fresh meat, as well as electronics, fashion, and similar items for which demand drops significantly after a next generation of electronic devices or a new season of fashion is released.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data.

Customer data 272 may comprise customer identity information, including, for example, customer relationship management data, loyalty programs, and mappings between product purchases and one or more customers so that a customer associated with a transaction may be identified. Customer data 272 may comprise data relating customer purchases to one or more products, geographical regions, store locations, or other types of dimensions.

Demand forecasts 274 of database 134 may indicate future expected demand based on, for example, any data relating to past sales, past demand, purchase data, promotions, events, or the like of one or more supply chain entities 140. Demand forecasts 274 may cover a time interval such as, for example, by the minute, by the hour, daily, weekly, monthly, quarterly, yearly, or any other suitable time interval, including substantially in real time. Demand may be modeled as a negative binomial or Poisson-Gamma distribution. According to other embodiments, the model also takes into account shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. When each location of this exemplary supermarket is open every day of the year, planning and execution system 130 comprising a demand planner needs to calculate approximately $2\times10^{\wedge}10$ demand forecasts 274 each day to derive the optimal order volume for the next delivery cycle (e.g., three days).

Supply chain models 276 of database 134 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 276 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for, by particular customers. Each of these characteristics may lead to a different supply chain model. Prediction models 278 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
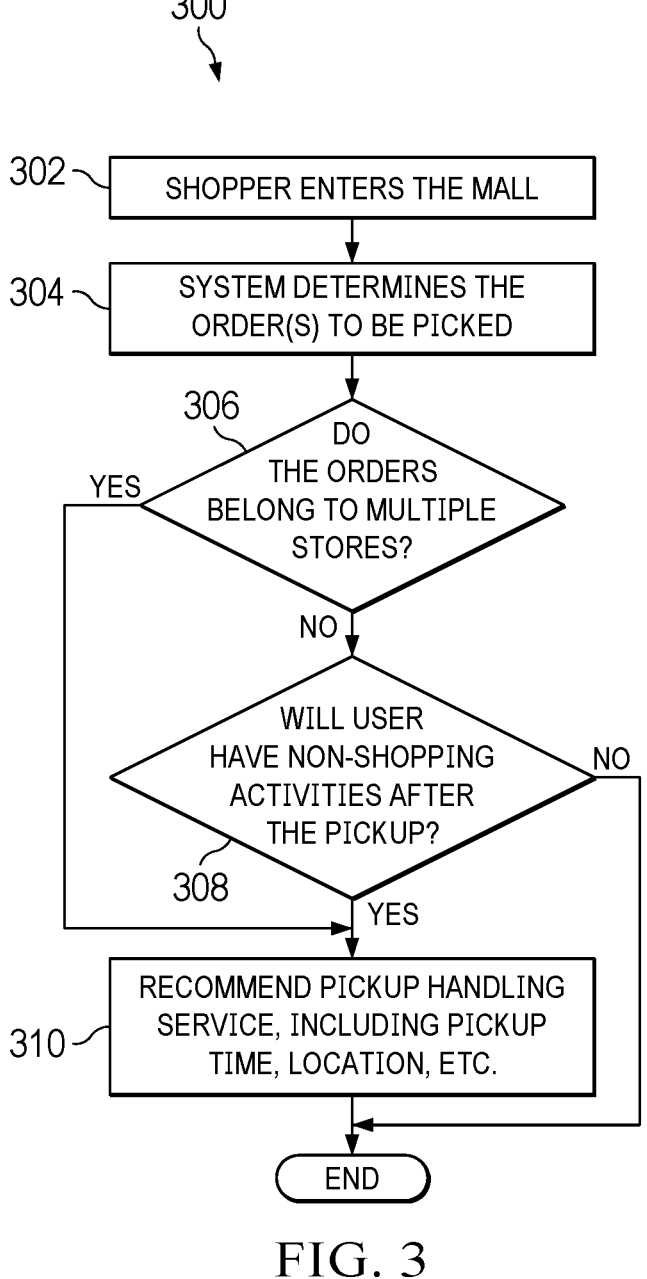
FIG. 3 illustrates a method for consolidating orders in a shopping mall, in accordance with an embodiment.

FIG. 3 illustrates method 300 for consolidating orders in a shopping mall, in accordance with an embodiment. Method 300 may be performed by a consolidated delivery system, such as consolidated delivery system 110 of FIG. 1. Method 300 proceeds by one or more activities, which although described in a particular order, may be performed in one or more permutations, combinations, orders, or repetitions, according to particular needs.

At activity 302, shopper detection module 202 of consolidated delivery system 110 detects that a shopper has entered the shopping mall. As discussed in further detail above, shopper detection module 202 may use detection data 220 to determine that the shopper has entered the shopping mall. In embodiments, when the shopper has previously agreed to such data collection, shopper detection module 202 may utilize facial recognition from one or more video cameras within the shopping mall to determine that the shopper has entered the shopping mall.

At activity 304, activity prediction module 204 of consolidated delivery system 110 determines one or more orders that the shopper is expected to pick up during the visit to the shopping mall. For example, activity prediction module 204 may determine one or more orders that the shopper has a scheduled pickup appointment for.

At activity 306, fulfillment module 206 of consolidated delivery system 110 determines whether the orders determined at activity 304 belong to multiple stores of the shopping mall. When fulfillment module 206 determines that the orders belong to multiple stores, at activity 308, fulfillment module 206 recommends a pickup handling service for the orders, including, for example, a pickup time, a pickup location, and any other necessary details of the consolidated order. As discussed in further detail below, fulfillment module 206 may consider various factors or constraints of the shopping mall itself to determine the recommended consolidated order.

When, at activity 306, fulfillment module 206 determines that the orders do not belong to multiple stores, then, at activity 310, activity prediction module 204 determines whether the shopper is expected to have any non-shopping activities within the shopping mall (e.g., attending a movie screening, going to a restaurant, etc.) after picking up the orders. When activity prediction module 204 determines that the shopper is not expected have any non-shopping activities, then fulfillment module 206 does not make a recommendation and method 300 ends. However, when activity prediction module 204 determines that the shopper is expected to have non-shopping activities, then, at activity 310, fulfillment module 206 recommends a consolidated order pickup for the shopper so that the orders may be picked up after the non-shopping activities.

By way of example only and not by way of limitation, method 300 is described in connection with the following example. In this example, a shopper enters a shopping mall, which shopper detection module 202 of consolidated delivery system 110 detects at activity 302. At activity 304, activity prediction module 204 of consolidated delivery system 110 determines that the shopper has two orders to be picked up from the shopping mall: one at Store A at 8:00 PM, and one at Store B at 8:15 PM. At activity 306, activity prediction module 204 determines that the two orders of the shopper belong to two different stores of the mall. Activity prediction module 204 also determines that the shopper has a reservation at a restaurant in the shopping mall from 8:30 to 9:30 PM, as well as a movie booked from 9:30 PM to 12:30 AM.

At activity 310, when the shopper picks up the first order from Store A, fulfillment module 206 of consolidated delivery system 110 recommends to the personnel of Store A via user interface 210 to offer a consolidated pickup of both orders to the shopper at 12:30 AM from a pickup slot near the parking lot where the shopper parked his car. The shopper further decides to purchase an item from Store C during his trip to the shopping mall, which fulfillment module 206 includes in the consolidated pickup order. As the stores of the shopping mall close at 10:30 PM, fulfillment module 206 generates a pick plan to pick the items from all three stores to be placed in the pickup slot nearest to the car of the shopper and sends a message to the shopper informing him of the pickup slot number and location.

FIG. 4 illustrates method 400 for consolidating orders of recommended items, in accordance with an embodiment. Method 400 may be performed by a consolidated delivery system, such as consolidated delivery system 110 of FIG. 1. Method 400 proceeds by one or more activities, which although described in a particular order, may be performed in one or more permutations, combinations, orders, or repetitions, according to particular needs.

At activity 402, shopper detection module 202 of consolidated delivery system 110 detects that a shopper has entered the shopping mall. As disclosed above, shopper detection module 202 may use various data of the shopper to detect that the shopper has entered the shopping mall, such as, for example, detection data 220, location data, parking or vehicle data, calendar data, purchase data, and the like. At activity 404, activity prediction module 204 of consolidated delivery system 110 determines one or more orders that the shopper is expected to pick up during the visit to the shopping mall. For example, shopper detection module 202 may determine one or more orders that the shopper has a scheduled pickup appointment for. Activity prediction module 204 may also predict orders that the shopper is likely to place during the duration of the visit to the shopping mall, which may be based on shopper data 222 such as shopping history or shopper preferences, as discussed in further detail above.

At activity 406, fulfillment module 206 of consolidated delivery system 110 determines whether the orders belong to multiple stores of the shopping mall. When fulfillment module 206 determines that the orders do not belong to multiple stores, then, at activity 408, fulfillment module 206 determines whether the shopper is expected to have any non-shopping activities within the shopping mall after picking up the orders. When the shopper is not expected to have any non-shopping activities, then fulfillment module 206 does not make a recommendation and method 400 ends. However, when the shopper is expected to have non-shopping activities, then method 400 proceeds to activity 410. When, at activity 406, fulfillment module 206 determines that the orders do belong to multiple stores, or when it is possible that the shopper may make a purchase of a recommended item at multiple stores, method 400 proceeds to activity 410. At activity 410, fulfillment module 206 determines a consolidated fulfillment option for handling the orders and/or potential orders. The consolidated fulfillment option may include a pickup of the orders by the shopper from a pickup locker, curbside pickup by the shopper, delivery of the orders to the shopper, or other possible fulfillment options.

At activity 412, user interface module 210 of consolidated delivery system 110 prompts and receives confirmation from the shopper of the consolidated fulfillment option. User interface module 210 may prompt the shopper for confirmation on a device associated with the shopper, such as, for example, a mobile device, an in-car audio system, an AR glass, or any other device associated with the shopper. The prompt for confirmation may also include an option for the shopper to change the recommended fulfillment option, such as changing from pickup to delivery, or vice versa.

To further illustrate the operation of method 400, a nonlimiting example is provided. In this example, a shopper goes to a shopping mall, which shopper detection module 202 detects at activity 402, and buys a dress from Store D at around 8:00 PM, which activity prediction module 204 determines at activity 404. At activity 406, fulfillment module 206 determines that the order of the shopper is entirely from Store D and not from multiple stores. Then, at activity 408, fulfillment module 206 determines that the shopper also has a movie booked from 9:30 PM to 12:30 AM. Using the systems and methods disclosed herein, after buying the dress from Store D, fulfillment module 206 determines a consolidated fulfillment method and recommends to the store personnel to offer consolidated pickup at 12:30 AM (after the movie) from a pickup slot near the parking lot the shopper parked in. The shopper confirms the consolidated fulfillment method, which the store personnel input to user interface module 210. The store personnel further inform the shopper that any other items that are subsequently purchased may be added to the consolidated pickup order as well. The shopper then buys additional items from other stores of the shopping mall, including a large, heavy item from Store E. At checkout of the large, heavy item, fulfillment module 206 determines a consolidated fulfillment method for the item at activity 410 and recommends to the personnel of Store D to offer a consolidated delivery of all items to the home of the shopper the next morning instead of the consolidated pickup. The shopper confirms the updated consolidated fulfillment method at activity 412.

FIG. 5 illustrates method 500 for consolidating orders for fulfillment, in accordance with an embodiment. Method 500 may be performed by a consolidated delivery system, such as consolidated delivery system 110 of FIG. 1. Method 500 proceeds by one or more activities, which although described in a particular order may, be performed in one or more permutations, combinations, orders, or repetitions, according to particular needs.

At activity 502, shopper detection module 202 of consolidated delivery system 110 detects that a shopper has arrived at a physical shopping mall. Shopper detection module 202 may use various data sources to detect the shopper, including calendar data of the shopper, manual input from the shopper, a first order made by the shopper in the shopping mall, a first pick operation initiated for an order of the shopper (which may occur before a scheduled pickup appointment of the shopper), face detection of the shopper, parking data indicating that a car associated with the shopper has parked at the shopping mall, or location data of a device associated with the shopper.

At activity 504, activity prediction module 204 of consolidated delivery system 110 determines and predicts the items and/or orders that the shopper is expected to pick up and/or likely to purchase during the current visit to the shopping mall. Activity prediction module 204 may use various streams of shopper data 222 to determine and predict the items, such as a purchase history of the shopper, IoT data associated with the shopper, a calendar of the shopper, a profile (which may include wish lists or other data) of the shopper, and messages of the shopper. For example, the purchase history may indicate that a shopper visits the shopping mall on a particular day of the week, every week, to buy groceries. In such a case, activity prediction module 204 may determine that the shopper is likely to make grocery purchases when the shopper arrives at the shopping mall on that day of the week.

At activity 506, activity prediction module 204 determines whether the shopper is expected to participate in other non-shopping activities in the shopping mall, as well as a predicted exit time of the shopper from the shopping mall. Activity prediction module 204 may also use shopper data 222, such as purchase history, IoT data, calendar data, a profile of the shopper, and messages of the shopper, to predict the non-shopping activities and the exit time. For example, a calendar of the shopper may include a scheduled movie, which may indicate both a non-shopping activity and an exit time of when the time the movie is scheduled to end. At activity 508, activity prediction module 204 determines whether the shopper may need to carry at least one bag from one location of the shopping mall to another based on the previously predicted orders and non-shopping activities.

When activity prediction module 204 determines that the shopper is expected to carry at least one bag, at activity 510, fulfillment module 206 of consolidated delivery system 110 determines a consolidated pickup service or delivery service for the items. Fulfillment module 206 may use various sources of mall data 224 to determine the fulfillment service, such as characteristics of the parking lot of the shopping mall, the types of items purchased, and the resource capacity of the shopping mall. As an example of resource capacity, a shopping mall may have a certain allocation of labor or timeslots to perform delivery or curbside pickup services or may have a limited number of pickup bays or lockers to perform pickup services. Fulfillment module 206 may also consider the types and/or sizes of items that activity prediction module 204 has predicted that the shopper is expected to purchase. For example, when activity prediction module 204 has predicted that the shopper is expected to buy a large or heavy item, fulfillment module 206 may be more likely to recommend a delivery service rather than a pickup service.

At activity 512, user interface module 210 of consolidated delivery system 110 offers the fulfillment service determined at activity 510 to the shopper, with an option to switch to another service. For example, the shopper may decline delivery service on a subsequent day for a pickup service on the same day instead. As a further example, when the shopper is purchasing items for another person, the shopper may decline pickup service in favor of a delivery service directly to the home of the other person.

To further illustrate the operation of method 500, a non-limiting example is provided. In this example, two shoppers, Shopper A and Shopper B, have planned a visit to a shopping mall, where Shopper A and Shopper B plan to have dinner and watch a movie once they have finished shopping. Shopper A plans to pick up a dress that was previously ordered online and plans to buy weekly grocery items during the visit, while shopper B is not a regular visitor of the shopping mall but has a wish list stored in an application associated with a store in the shopping mall.

At activity 502, shopper detection module 202 detects that Shopper A and Shopper B have arrived at the shopping mall based on active location services of a smartphone associated with Shopper A and a smartphone associated with Shopper B. At activity 504, activity prediction module 204 determines that Shopper A is likely to pick up the previously-ordered dress and is also likely purchase grocery items based on a purchase history associated with Shopper A. Activity prediction module 204 also predicts that Shopper B may buy a pair of headphones based on the wish list associated with Shopper B. At activity 506, activity prediction module 204 determines that Shopper A and Shopper B plan to have dinner and then attend a movie. Based on the expected shopping predicted at activity 504 and the dinner and movie predicted at activity 506, activity prediction module 204 determines that the shoppers are likely to carry multiple bags throughout the shopping mall. At activity 510, fulfillment module 206 determines a consolidated pickup service for Shopper A and Shopper B of having the items purchased placed in a secure pickup bin near the parking spot that Shopper A and Shopper B are parked. At activity 512, user interface module 210 informs Shopper A and Shopper B, at the time of parking, that a pickup bin has been assigned to both Shopper A and Shopper B and that any orders placed will be placed in the pickup bin. Shopper A and Shopper B complete their shopping without carrying any items and go to dinner and the movie without carrying bags, then upon finishing the movie, they pick up their orders from the assigned pickup bin and drive home.

In embodiments, a shopping mall may implement a consolidated order service by onboarding stores of the shopping mall and setting up pickup bins. The cost of the pickup bins or other dedicated resources for pickup or delivery may be shared by participating stores. The location of pickup bins may be determined based on the layout of a parking or exit area. In some embodiments, each parking lot may have an associated pickup bin. Pickup bins may have multiple shelves with each shelf being secured through a different authentication method, such as, for example, a password, fingerprint scan, and the like.

According to embodiments, recommendation module 208 of consolidated delivery system 110 may perform prediction of additional items to help a shopping mall offer more convenient and organized services. That is, when the service is offered when a shopper enters the shopping mall, the shopper may feel free to do whatever the shopper had planned right from entry, improving customer convenience. However, in an embodiment, the consolidated order service may be offered independently of any prediction. That is, the stores in the shopping mall may provide the consolidated order service when a sale is made.

In some cases, items recommended for purchase or items which a shopper attempts to purchase may not be available in stores of a shopping mall at the time of visit. In such cases, consolidated delivery system 110 may offer the consolidated delivery/pickup service considering the date of availability. For example, when inventory for a predicted item is to be received later in a current day, consolidated delivery system 110 may offer consolidated home delivery of all items the next morning. As another option in such cases, consolidated delivery system 110 may offer consolidated pickup/delivery service considering the availability of substitute items for the unavailable items.

In some cases, items may need to be delivered to an address of a person other than the shopper or at a new address of the shopper. In such cases, consolidated delivery system 110 may provide an option to update the offered consolidated delivery service, and the shopper may add or update the address using an update option for the offered service.

In embodiments, shoppers who visit a shopping mall to pick up a previously purchased item may also buy an extra/predicted item. When the shopper buys an extra item and the shopper opts for a consolidated home delivery option, consolidated delivery system 110 also determines a delivery charge distribution. The delivery charge distribution may be based on agreement between the shopping mall and the stores of the shopping mall which are collaborating. For example, as an option, the seller of a confirmed sale, (that is, items already purchased waiting for pickup) may pay no or minimal delivery charges. As another option, the delivery charge may be distributed based on attributes of the items sold, such as price, dimensions, special handling requirements, and the like.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a computer, comprising a processor and a memory, the computer configured to:
detect that a shopper has arrived at a physical shopping mall based on facial recognition of the shopper from one or more cameras within the physical shopping mall;
determine and predict one or more items or one or more orders that the shopper is expected to pick up or likely to purchase during a current visit to the physical shopping mall;

determine whether the shopper is expected to participate in one or more other non-shopping activities in the physical shopping mall, and determine a predicted exit time of the shopper from the physical shopping mall;
in response to determining that the shopper is expected to carry at least one bag, determine a consolidated pickup service or a delivery service for the one or more items or the one or more orders; and
offer, by a user interface module to a mobile device of the shopper before the predicted exit time, the determined consolidated pickup service or the determined delivery service to the shopper.

2. The system of claim 1, wherein the detecting that the shopper has arrived at the physical shopping mall is based on, at least in part, one or more of:
active location services of a smartphone of the shopper, calendar data of the shopper, a manual input from the shopper and a first order made by the shopper at the physical shopping mall.

3. The system of claim 1, wherein the determining and the predicting the one or more items or the one or more orders are based on, at least in part, one or more of:
a purchase history of the shopper, internet of things data associated with the shopper, a calendar of the shopper, a profile of the shopper, a wish list of the shopper and one or more messages of the shopper.

4. The system of claim 1, wherein the determining whether the shopper is expected to participate in one or more other non-shopping activities in the physical shopping mall, and the determining a predicted exit time of the shopper from the physical shopping mall are based on, at least in part, one or more of:
shopper data, purchase history, internet of things data, calendar data, a profile of the shopper and one or more messages of the shopper.

5. The system of claim 1, wherein the determining the consolidated pickup service or the delivery service is based on, at least in part, one or more of:
characteristics of a parking lot of the physical shopping mall, one or more types of the one or more items purchased or the one or more orders purchased and a resource capacity of the shopping mall.

6. The system of claim 1, further comprising:
one or more pickup bins set up for pickup or delivery of the one or more items or the one or more orders.

7. The system of claim 1, wherein the computer is further configured to:
offer, by a user interface module, the determined consolidated pickup service or the determined delivery service to the shopper based on, at least in part, the date of availability of the one or more items or the one or more orders.

8. A computer-implemented method, comprising:
detecting, by a computer comprising a processor and a memory, that a shopper has arrived at a physical shopping mall based on facial recognition of the shopper from one or more cameras within the physical shopping mall;
determining and predicting, by the computer, one or more items or one or more orders that the shopper is expected to pick up or likely to purchase during a current visit to the physical shopping mall;
determining, by the computer, whether the shopper is expected to participate in one or more other non-shopping activities in the physical shopping mall, and determine a predicted exit time of the shopper from the physical shopping mall;

in response to determining that the shopper is expected to carry at least one bag, determining, by the computer, a consolidated pickup service or a delivery service for the one or more items or the one or more orders; and offering, by a user interface module to a mobile device of the shopper before the predicted exit time, the determined consolidated pickup service or the determined delivery service to the shopper.

9. The computer-implemented method of claim 8, wherein the detecting that the shopper has arrived at the physical shopping mall is based on, at least in part, one or more of:

active location services of a smartphone of the shopper, calendar data of the shopper, a manual input from the shopper and a first order made by the shopper at the physical shopping mall.

10. The computer-implemented method of claim 8, wherein the determining and the predicting the one or more items or the one or more orders are based on, at least in part, one or more of:

a purchase history of the shopper, internet of things data associated with the shopper, a calendar of the shopper, a profile of the shopper, a wish list of the shopper and one or more messages of the shopper.

11. The computer-implemented method of claim 8, wherein the determining whether the shopper is expected to participate in one or more other non-shopping activities in the physical shopping mall, and the determining, by the computer, a predicted exit time of the shopper from the physical shopping mall are based on, at least in part, one or more of:

shopper data, purchase history, internet of things data, calendar data, a profile of the shopper and one or more messages of the shopper.

12. The computer-implemented method of claim 8, wherein the determining the consolidated pickup service or the delivery service is based on, at least in part, one or more of:

characteristics of a parking lot of the physical shopping mall, one or more types of the one or more items purchased or the one or more orders purchased and a resource capacity of the shopping mall.

13. The computer-implemented method of claim 8, further comprising:

providing one or more pickup bins set up for pickup or delivery of the one or more items or the one or more orders.

14. The computer-implemented method of claim 8, further comprising:

offering, by a user interface module, the determined consolidated pickup service or the determined delivery service to the shopper based on, at least in part, the date of availability of the one or more items or the one or more orders.

15. A non-transitory computer-readable medium embodied with software, the software when executed is configured to:

detect, by a computer comprising a processor and a memory, that a shopper has arrived at a physical shopping mall based on facial recognition of the shopper from one or more cameras within the physical shopping mall;

determine and predict one or more items or one or more orders that the shopper is expected to pick up or likely to purchase during a current visit to the physical shopping mall;

determine whether the shopper is expected to participate in one or more other non-shopping activities in the physical shopping mall, and determine a predicted exit time of the shopper from the physical shopping mall;

in response to determining that the shopper is expected to carry at least one bag, determine a consolidated pickup service or a delivery service for the one or more items or the one or more orders; and offer, by a user interface module to a mobile device of the shopper before the predicted exit time, the determined consolidated pickup service or the determined delivery service to the shopper.

16. The non-transitory computer-readable medium of claim 15, wherein the detecting that the shopper has arrived at the physical shopping mall is based on, at least in part, one or more of:

active location services of a smartphone of the shopper, calendar data of the shopper, a manual input from the shopper and a first order made by the shopper at the physical shopping mall.

17. The non-transitory computer-readable medium of claim 15, wherein the determining and the predicting the one or more items or the one or more orders are based on, at least in part, one or more of:

a purchase history of the shopper, internet of things data associated with the shopper, a calendar of the shopper, a profile of the shopper, a wish list of the shopper and one or more messages of the shopper.

18. The non-transitory computer-readable medium of claim 15, wherein the determining whether the shopper is expected to participate in one or more other non-shopping activities in the physical shopping mall, and the determining a predicted exit time of the shopper from the physical shopping mall are based on, at least in part, one or more of:

shopper data, purchase history, internet of things data, calendar data, a profile of the shopper and one or more messages of the shopper.

19. The non-transitory computer-readable medium of claim 15, wherein the determining the consolidated pickup service or the delivery service is based on, at least in part, one or more of:

characteristics of a parking lot of the physical shopping mall, one or more types of the one or more items purchased or the one or more orders purchased and a resource capacity of the shopping mall.

20. The non-transitory computer-readable medium of claim 19, wherein the software when executed is further configured to:

offer, by a user interface module, the determined consolidated pickup service or the determined delivery service to the shopper based on, at least in part, the date of availability of the one or more items or the one or more orders.

\* \* \* \* \*